(12) United States Patent
McCaffrey et al.

(10) Patent No.: US 9,823,935 B2
(45) Date of Patent: Nov. 21, 2017

(54) TECHNIQUES FOR LATCHING INPUT EVENTS TO DISPLAY FLIPS

(75) Inventors: Jonathan Baird McCaffrey, Skaneateles, NY (US); Robert Charles Barris, Tustin Ranch, CA (US); Chi Zhang, Pittsburgh, PA (US)

(73) Assignee: NVIDIA CORPORATION, Santa Clara, CA (US)

( * ) Notice: Subject to any disclaimer, the term of this patent is extended or adjusted under 35 U.S.C. 154(b) by 153 days.

(21) Appl. No.: 13/559,546

(22) Filed: Jul. 26, 2012

(65) Prior Publication Data

US 2014/0028574 A1    Jan. 30, 2014

(51) Int. Cl.
G09G 3/34    (2006.01)
G06F 9/44    (2006.01)

(52) U.S. Cl.
CPC .................. *G06F 9/4443* (2013.01)

(58) Field of Classification Search
CPC ..................................... G06F 9/4443
USPC ................................. 345/156, 173
See application file for complete search history.

(56) References Cited

U.S. PATENT DOCUMENTS

| 5,124,804 | A | 6/1992 | Socarras |
| 5,646,675 | A | 7/1997 | Copriviza et al. |
| 7,441,233 | B1 * | 10/2008 | Orndorff ............... G06F 9/4443 717/107 |
| 9,342,181 | B2 | 5/2016 | Wyatt et al. |
| 2002/0036656 | A1 | 3/2002 | Francis et al. |
| 2002/0085118 | A1 | 7/2002 | Harris et al. |
| 2003/0076289 | A1 | 4/2003 | Tokonami et al. |
| 2004/0041769 | A1 | 3/2004 | Yamashita et al. |
| 2005/0171879 | A1 | 8/2005 | Lin |
| 2008/0036743 | A1 * | 2/2008 | Westerman ............. G06F 3/038 345/173 |
| 2008/0082930 | A1 * | 4/2008 | Omernick et al. ............ 715/765 |
| 2008/0100597 | A1 | 5/2008 | Quan |
| 2008/0162997 | A1 | 7/2008 | Vu et al. |
| 2008/0165141 | A1 * | 7/2008 | Christie .................. G06F 3/044 345/173 |
| 2008/0209114 | A1 | 8/2008 | Chow et al. |
| 2009/0164951 | A1 * | 6/2009 | Kumar ................ G06F 3/04883 715/863 |
| 2009/0224776 | A1 | 9/2009 | Keith |

(Continued)

FOREIGN PATENT DOCUMENTS

| CN | 101673155 | 3/2010 |
| CN | 102187298 | 9/2011 |

*Primary Examiner* — Benyam Ketema

(57) ABSTRACT

A system including one or more input interface drivers, an input dispatcher, one or more applications, a system compositor and one or more output interface drivers. The input interface driver receives input events. The input dispatcher is modified to dispatch a current input event to a corresponding application after receiving an indication that a display image based upon a previous input event has been posted to an output interface driver. The corresponding application renders a new display image based upon the current input event. The system compositor posts the new display image to the output interface driver. The system compositor is also modified to send an indication to the input dispatcher that the new display image has been posted to the output interface driver. The system iteratively performs the process to latch the dispatching of input events to the display flip.

20 Claims, 3 Drawing Sheets

(56) References Cited

U.S. PATENT DOCUMENTS

| | | |
|---|---|---|
| 2009/0273556 A1 | 11/2009 | Shimoshikiryoh et al. |
| 2010/0097343 A1 | 4/2010 | Fang |
| 2010/0134437 A1 | 6/2010 | Yang et al. |
| 2010/0235732 A1* | 9/2010 | Bergman ............ G06F 3/0488 715/702 |
| 2010/0238130 A1 | 9/2010 | Lin et al. |
| 2010/0253639 A1 | 10/2010 | Huang et al. |
| 2011/0122088 A1 | 5/2011 | Lin et al. |
| 2011/0127340 A1* | 6/2011 | Aiken ................ F24F 11/0001 236/49.3 |
| 2011/0181519 A1 | 7/2011 | Tsai et al. |
| 2012/0019467 A1 | 1/2012 | Hotelling et al. |
| 2012/0030623 A1* | 2/2012 | Hoellwarth .................. 715/811 |
| 2012/0050206 A1 | 3/2012 | Welland |
| 2012/0054379 A1 | 3/2012 | Leung et al. |
| 2012/0075188 A1 | 3/2012 | Kwa et al. |
| 2012/0084798 A1* | 4/2012 | Reeves ............... H04L 67/1095 719/319 |
| 2012/0176327 A1 | 7/2012 | Na et al. |
| 2012/0176546 A1* | 7/2012 | Yoon ............................ 348/600 |
| 2012/0229419 A1 | 9/2012 | Schwartz et al. |
| 2012/0262463 A1* | 10/2012 | Bakalash et al. ............ 345/501 |
| 2012/0268416 A1 | 10/2012 | Pirogov et al. |
| 2013/0038587 A1 | 2/2013 | Song et al. |
| 2013/0069894 A1 | 3/2013 | Chen et al. |
| 2013/0176251 A1 | 7/2013 | Wyatt et al. |
| 2014/0340387 A1 | 11/2014 | Song et al. |

* cited by examiner

TECHNIQUES FOR LATCHING INPUT EVENTS TO DISPLAY FLIPS

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science.

In some computing devices, such as desktop PCs, laptop PCs and the like, input events that affect the image of icons, menus, widgets, windows, cursor/pointers and the like on the display are processed by the operating system and not the application themselves. The display renders continuously under control of the operating system. Therefore, the input events may produce smooth motion on the display.

However, in other computing devices the applications themselves render the images that are output on the display. In smart phones, table PCs, netbooks and the like computing devices, an application will attempt to re-render when a currently displayed image is made invalid by a new input event or computation. For example, on a touch screen enabled device, the user receives feedback when an input event is sent to the applicable application, which in turn redraws the display image in response to the input. In such cases, the input event may be received too late to be rendered in time for the next display refresh, multiple input events may be dispatched for rendering in, a single display flip, and/or the like. Achieving smooth motion in such display invalidate-based systems is therefore challenging. Accordingly, there is a continued need for improved invalidate-based display techniques.

SUMMARY OF THE INVENTION

The present technology may best be understood by referring to the following description and accompanying drawings that are used to illustrate embodiments of the present technology directed toward techniques for latching input events to display cycle flips.

In one embodiment, an invalidate-based display method includes receiving a given input event by an input interface driver. An input dispatcher dispatches the given input event to an application after receiving an indication that an invalidate-based display image based upon a previous input event has been posted to an output interface driver. The application thereafter renders an invalidate-based display image based upon the given input event. The invalidate-based display image based upon the given input event is posted by a system compositor to the output interface driver. In addition, the system compositor sends an indication to the input dispatcher that the invalidate-based display image based upon the given input event has been posted to the output interface driver.

In another embodiment, one or more computing device readable media storing one or more sets of computing device executable instructions which when executed by one or more processing units implement an invalidate-based display system. The system includes an input interface driver to receive input events. An input dispatcher dispatches a current input event to a corresponding application after receiving an indication that a display image based upon a previous input event has been posted to an output interface driver. The corresponding application renders a new display image based upon the current input event. A system compositor posts the new display image to the output interface driver and sends an indication that the new display image has been posted to the output interface driver. The indication that the new display image has been posted becomes the indication that the display image based upon the previous input event has been posted at the input dispatcher.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
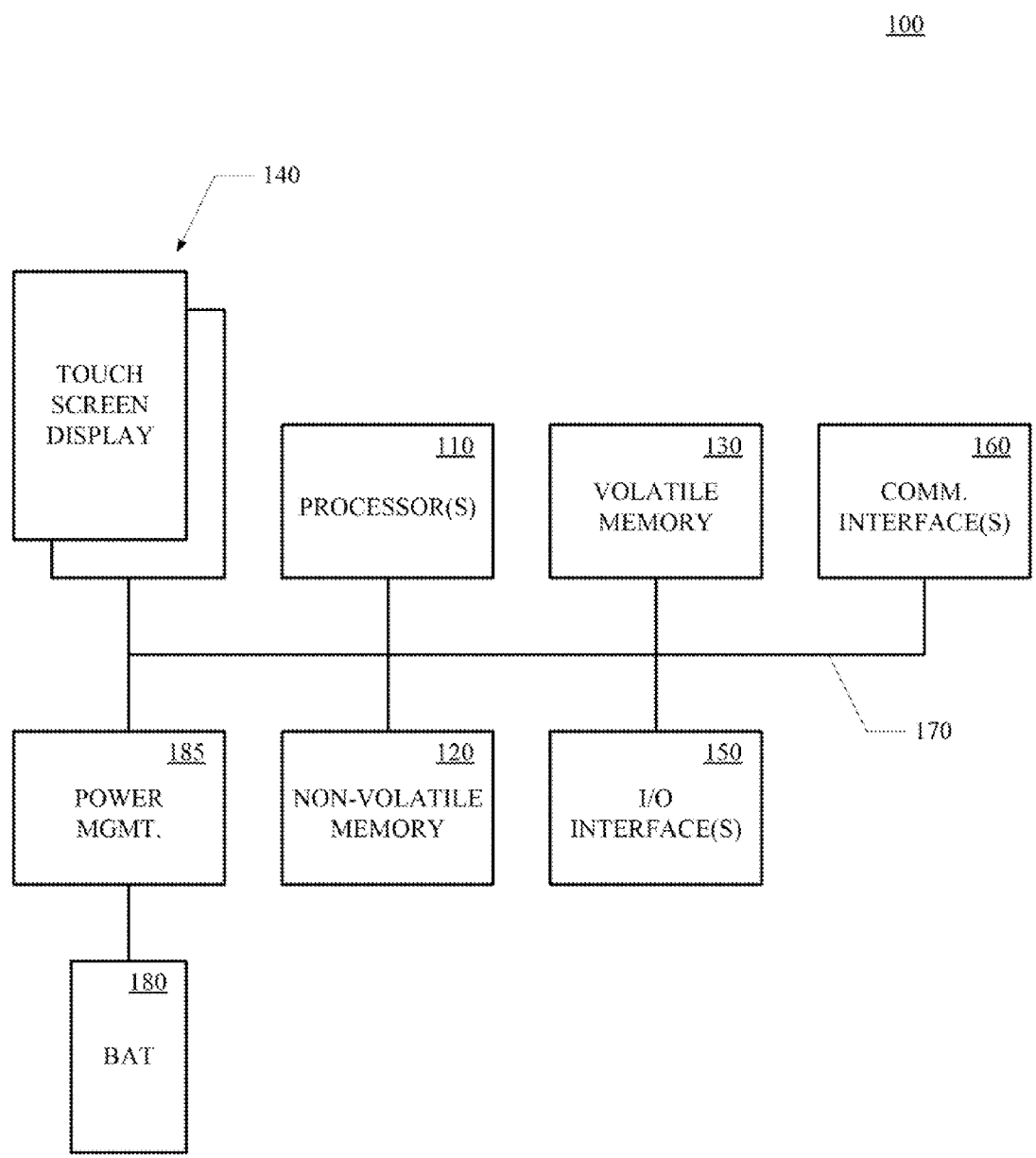
FIG. 1 shows a block diagram of an exemplary computing device for implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, an exemplary computing device for implementing embodiments of the present technology, is shown. The computing device 100 may include one or more processing units 110, one or more computing device readable storage units 120, 130, a display 140, one or more input/output (I/O) interfaces 150, and one or more communication interfaces 160 communicatively coupled together by one or more buses 170. The one or more processing units 110 may include one or more microprocessors, central processing units (CPU), digital signal processors (DSP), graphics processors (GPU), microcontrollers, embedded controllers and/or the like. The processing units 110 may be complex instruction set (CISC) processors, reduced instruction set (RISC) processors, acorn reduced instruction set (ARM) processors, and/or the like. The computing device readable storage units 120, 130 may include one or more flash memories, random access memories (RAM), read only memories (ROM), hard disks, optical disks and/or the like. The input/output interfaces 150 may include one or more buttons, indicator lights, keyboard, pointing device, accelerometer, gyroscope, magnetometer, camera, speaker, microphone, microphone jack, speaker jack, USB port, memory card port, and/or the like. The one or more communication interfaces 160 may include GMS, GSM/EDGD, CDMA, IDEN, UMTS, EV-DO, Bluetooth, Wi-Fi, LTE, NFC, WiMAX, SMS, MMS, C2DM, GPS and/or the like communication interfaces.

The computing device may include one or more additional subsystems. For example, a battery powered computing device may include a battery 180 and optionally a power management unit 185. Similarly, one or more subsystems of the computing device may be integrated together or divided into separate subsystems. For example, the computing device may include a touch screen display including a touch sensor overlaid on a display. In another example, the computing device readable storage units may include one or more non-volatile memory units 120 and/or one or more volatile memory units 130. The computing device may implement a smart phone, cell phone, tablet PC, netbook, portable game player, personal digital assistant, game console, or the like.

The processing unit 110 executes one or more sets of computing device executable instructions (e.g. software) stored in the one or more memory units 120, 130 to implement one or more applications, operating systems (OS), tools, utilities, scripts, drivers, routines and/or the like and/or manipulate one or more data structures such as files, tables, databases, registries, libraries, and/or the like. Typically, the computing device executable instructions are stored in one or more non-volatile memory units 120 and read into a volatile memory unit 130 for execution by the processing unit 110.

The processing unit 110 executes one or more sets of computing device executable instructions to implement an operating system. In one implementation, the operating system may be a Linux-based operating system such as ANDROID. The operating system, such as ANDROID, typically implements a plurality of layers including, an application framework, libraries, a runtime, a kernel and/or the like. The processing unit 110 also executes one or more additional sets of computing device executable instructions to implement one or more applications. One or more of the applications may receive one or more inputs that may change the display output generated by the application. In operating systems, in accordance with embodiments of the present technology, the rendered images on the display are processed by the application on invalidate-basis, In such cases, the application may receive an input that may change the image to be rendered. For example, one or more location inputs corresponding to activation of a touch screen display by a user may be received by an application. The location inputs may correspond to a user dragging their finger down through the choices of a menu including a plurality of selectable menu items. When an application changes a portion or the entire image to be rendered on the display, a display-invalidate input to the operating system is generated by the given application. The rendered image is then redrawn by the application.

Figure 2:
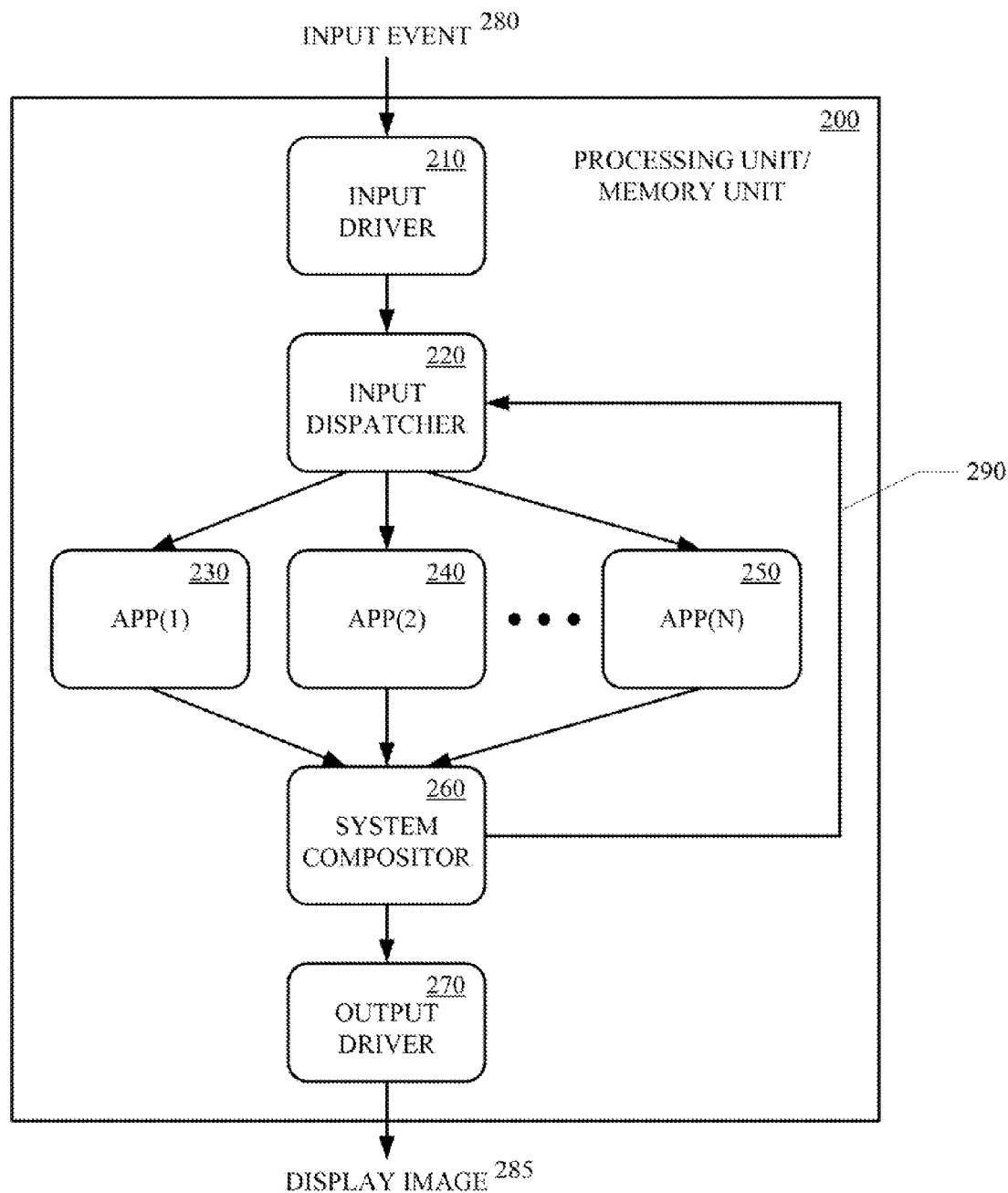
FIG. 2 shows a block diagram of a system implementing an invalidate-based display, in accordance with embodiments of the present technology.

Referring now to FIG. 2, a system implementing an invalidate-based display, in accordance with embodiments of the present technology, is shown. The system 200 may be implemented as one or more sets of computing device executable instructions that are stored in computing device readable media 120, 130 and executed by one or more processing units 110. The system 200 includes one or more input interface drivers 210, an input dispatcher 220, one or more applications 230-250, a system compositor 260, and one or more output interface drivers 270. In one implementation, an input interface driver 21.0 may be a touch sensor device driver The input interface drivers 210 may also include applicable control panel and/or keyboard device drivers. In one implementation, the input dispatcher 220 may be the ANDROID InputDispatcher. The one or more applications 230-240 may be any user application, utility, and/or the like. At least one application generates display images based upon input events. In one implementation, the system compositor 260 may be the ANDROID SurfaceFlinger system compositor. In one implementation, an output interface driver 270 may be a display device driver. In one implementation, the touch sensor device driver and display device driver may control operation of a touch panel display for receiving touch events (e.g., based upon user finger or stylus generated gestures) 280, and outputting display images 285. In one implementation, the touch sensor driver and display driver may be implemented as an integrated touch screen display driver. Similarly, other parts of the system may be further divided into separate sub-systems, or may be integrally implemented with other parts of the system.

Figure 3:
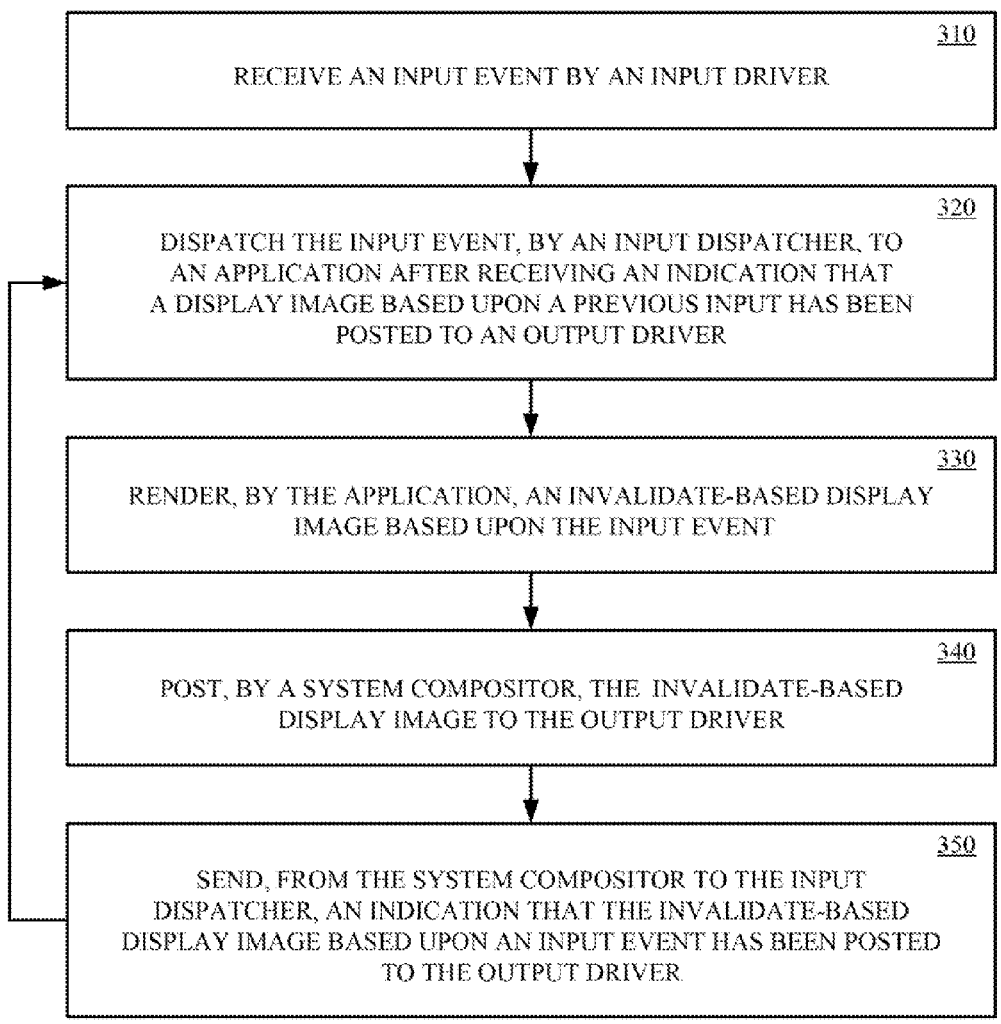
FIG. 3 shows a flow diagram of an invalidate-based display method, in accordance with embodiments of the present technology.

Operation of the system 200 will be further explained with reference to FIG. 3, which shows an invalidate-based display method, in accordance with embodiments of the present technology. The method begins with receiving input events 280 by an input interface driver 210, at 310. In one implementation, input events 280 are received by an input interface driver 210, such as a touch sensor device driver. In an ANDROID system, input events are typically received at a rate of up to 120-200 events per second. For a touch panel, the input event may include the x-y coordinate position of a sensed user finger, stylus or the like.

At 320, a current input event is dispatched to an appropriate application 240 after an indication that a display image based upon a previous input event has been posted to the output interface driver 270. In addition, a plurality of compatible events may be appended and sent together when an indication that a display image based upon the previous input event has been posted to the output driver 270. In one implementation, the input dispatcher 220 is modified to receive an indication from the system compositor 260 when the display image based upon the previous input event has been posed to the output interface driver 270. For example, the input dispatcher 220 can be modified to request a Unix pipe over a binder inter-process call (IPC) mechanism. The compositor 260 sends a signal over all such pipes after a frame has been posted and the flip has been triggered. By waiting for a signal over the pipe, the input dispatcher 220 can synchronize the timing of input event dispatching to the display flip and resulting rendering buffer availability. In one implementation, the ANDROID InputDispatcher of the system services is modified to receive the indication from the ANDROID SurfaceFlinger of the system services. In one implementation, the input events are dispatched on a per application basis. The input events for each applicable application may be stored in separate queues for dispatching on a per application basis by the input dispatcher. In another implementation, the input events are dispatched for all applications. The input events may be stored in a system-wide queue for dispatching.

At 330, a new display image based upon the current dispatched input event is rendered by the corresponding application 240. In one implementation, the applicable user application 240 renders a new display image based upon the input even dispatched by the ANDROID InputDispatcher. The input event may affect position, motion and/or the like of one or more icons, menus, widgets, windows, cursor, pointer, highlight and/or the like in the display image. When an application changes a portion or the entire image to he rendered on the display, the previous display image is invalidated by the new display image.

At 340, the system compositor 260 receives the new rendered display image based upon the current input event from the application 240 and posts it to the output interface driver 270. In one implementation, the ANDROID Surface-Flinger receives the new display image rendered by the applicable user application. The ANDIROID SurfaceFlinger posts the new display image to an output interface driver such as a display device driver. The display device driver converts the data of the rendered display image to electrical signals for driving the pixel array of the display. The display typically outputs images up to 60 times per second. When the system compositor 260 posts the rendered display image to the output interface driver 270, the rendering buffer is freed up for the application 240 to render another image.

At 350, the system compositor 260 also sends an indication to the input dispatcher 220 that that the display image has been posted to the output interface driver 270. In one implementation, the input dispatcher 220 is modified to receive an indication from the system compositor 260 when the display image based upon the previous input event has been posed to the output interface driver 270. For example, the system compositor 260 may be modified to act as a server for interested clients. Clients, such as the input dispatcher 220, can request a Unix pipe over the Binder inter-process call (IPC) mechanism. The compositor 260 sends a signal over all such pipes after a frame has been posted and the flip has been triggered. In one implementation, the ANDROID SurfaceFlinger sends a control signal over the pipes to the ANDROID InputDispatcher indicating, that the display image has been posted to the display driver. By waiting for a signal over the pipe, the input dispatcher 220 can synchronize the timing of input event dispatching to the display flip and resulting rendering buffer availability.

Accordingly, the input dispatcher dispatches a given input event to an application after receiving an indication that an invalidate-based display image based upon a previous input event has been posted to an output interface driver. The application renders an invalidate-based display image based upon the given input event which is posted by the system compositor to the output interface driver. The system compositor also sends an indication that the invalidate-based display image based upon the given input event has been posted to the output interface driver to the input dispatcher.

Upon receipt of the next input event by the input interface driver, the input dispatcher dispatches the next input event to the application after receiving the indication that the invalidate-based display image based upon the given input event has been posted to the output interface driver. The application renders an invalidate-based display image based upon the next input event which is posted by the system compositor to the output interface driver. The system compositor again sends an indication that the invalidate-based display image based upon the next input event has been posted to the output interface driver to the input dispatcher. The processes of 310-350 may be iteratively performed for each input event. The indication that the display image based upon the particular input event has been posted becomes the indication that the display image based upon the previous input event has been posted at the input dispatcher for each subsequent input event.

Embodiments of the present technology advantageously deliver one input event or one set of coalesced input events per display frame. Embodiments of the present technology advantageously deliver the input events at such time that they can each be processed and rendered in time to flip the display at the next display refresh cycle. Embodiments of the present technology advantageously synchronize dispatching of input events up to the refresh rate of the display if the application renders at a faster rate than the display rate of the display. If the application's rendering rate is slower than the display rate, than the dispatching of input events is synchronized to the rendering rate of the application. In addition, dispatching input events in response to the posting of the previous invalidate-based display image advantageously results in a greater available time for the application to render the next display image. Accordingly, embodiments advantageously couple the timing of dispatching events to the display flip. This is when graphics buffers being used for display become free, and the application can render again without blocking.

In contrast, according to the conventional art, the input dispatcher of the conventional ANDROID operating system dispatches input events based upon a predetermined time period. When an event is dispatched, a time-out is set and the next event is not dispatched before that time. The first event that arrives before the next time-out is held back. Additional compatible events that arrive may be appended as more recent samples on the earlier event. In such case, multiple compatible events can be transmitted with a single IPC handshake and traversal of the user interface widget hierarchy. However, this conventional technique suffers from phase shift issues, phase variance issues, and the like. With regard to phase shift, the time at which input events arrive during rendering is unpredictable and unspecified. In such case, an input event may arrive too late during rendering and posting of the current frame to be rendered for the next frame. With regard to phase variance, in the real world there will be a difference between the time-out period and the rate at which frames are output on the display. This leads to an occasional missed frames or double drawn frames, which manifest themselves as frames of user-precipitated stutter. Worse yet, if the time-out is consistently too long or too short with respect to the display refresh timing, a persistent and pernicious "beat frequency" between delivery of input events and the display flip results, which creates a consistent and repeatable timed hiccup in motion.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
receiving, by an input interface driver, input events, wherein a given input event is received during rendering of an invalidate-based display image based upon a previous input event, or posting of the invalidated-based display image based upon the previous input event;
dispatching, by an input dispatcher, the given input event to an application after receiving an indication that the invalidate-based display image based upon the previous input event has been posted to an output interface driver;
rendering, by the application, an invalidate-based display image based upon the given input event;
posting, by a system compositor, the invalidate-based display image based upon the given input event to the output interface driver; and
sending, from the system compositor to the input dispatcher, an indication that the invalidate-based display image based upon the given input event has been posted to the output interface driver so that the dispatching of the input events are synchronized to a refresh rate of a display driven by the output interface driver.

2. The method according to claim 1, further comprising:
receiving, by the input interface driver, a next input event:
dispatching, by the input dispatcher, the next input event to the application after receiving the indication that the invalidate-based display image based upon the given input event has been posted to the output interface driver;
rendering, by the application, an invalidate-based display image based upon the next input event;
posting, by the system compositor, the invalidate-based display image based upon the next input event to the output interface driver; and
sending, from the system compositor to the input dispatcher, an indication that the invalidate-based display image based upon the next input event has been posted to the output interface driver.

3. The method according to claim 1, further comprising:
requesting a Unix pipe between the system compositor and the input dispatcher over and an inter-process call (IPC) mechanism; and
wherein receiving the indication that the invalidate-based display image based upon the given input event has been posted to the output interface comprises passing an invalidate signal through the Unix pipe from the system compositor to the input dispatcher.

4. The method according to claim 1, further comprising:
receiving, by the input interface driver, a plurality of compatible input events;
appending the plurality of compatible input events together as a coalesced input event;
dispatching, by the input dispatcher, the coalesced input event to the application after receiving the indication that the invalidate-based display image based upon the given input event has been posted to the output interface driver;
rendering, by application, an invalidate-based display image based the coalesced input event;
posting, by the system compositor, the invalidate-based display image based upon the coalesced input event to the output interface driver; and
sending, from the system compositor to the input dispatcher, indication that the invalidate-based display image based upon the coalesced input event has been posted to the output interface driver.

5. The method according to claim 1, wherein sending, from the system compositor to the input dispatcher, the indication that the invalidate-based display image based upon the previous input event has been posted to the output interface driver enables delivery of the next input event to the application in time to he rendered by a next display refresh cycle.

6. The method according to claim 1, wherein dispatching of input events is synchronized to a rendering rate of the application if the application renders as a rate slower than the refresh rate of the display.

7. The method according to claim 1, wherein dispatching of input events is synchronized to the refresh rate of the display if the application renders at a rate faster than the refresh rate of the display.

8. The method according to claim 1, wherein a rendering buffer becomes available to the application for rendering the invalidate-based display image based upon the given input event when the invalidate-based display image based upon the previous input event is posted by the system compositor to the output interface driver.

9. The method according to claim 1, wherein the given input event comprises an x-y coordinate position of a user finger or stylus sensed by the input interface driver.

10. One or more non-transitory computing device readable media storing one or more sets of computing device executable instructions which when executed by one or more processing units implement a system comprising:
an input interface driver to receive input events, wherein a given input event is received during rendering of an invalidate-based display image based upon a previous input event, or posting of the invalidated-based display image based upon the previous input event;
an input dispatcher to dispatch the given input event to a corresponding application after receiving an indication that the invalidate-based display image based upon the previous input event has been posted to an output interface driver;
the corresponding application to render an invalidate-based display image based upon the given input event; and
a system compositor to post the invalidate-based display image based upon the given input event to the output interface driver and to send an indication that the invalidate-based display image based upon the given input event has been posted to the output interface driver so that the dispatching of the input events are synchronized to an operating rate of the output interface driver.

11. The one or more non-transitory computing device readable media including one or more sets of computing device executable instructions which when executed by the one or more processing units implement the system according to claim 10, wherein the input interface driver comprises a touch sensor device driver.

12. The one or more non-transitory computing device readable media including one or more sets of computing device executable instructions which when executed by the one or more processing units implement the system according to claim 10, wherein the output interface driver comprises a display device driver.

13. The one or more non-transitory computing device readable media including one or more sets of computing device executable instructions which when executed by the one or more processing units implement the system according to claim 10, wherein the input interface driver and output interlace driver comprise a touch screen device driver.

14. The one or more non-transitory computing device readable media including one or more sets of computing device executable instructions which when executed by the one or more processing units implement the system according to claim 10, wherein the input dispatcher comprises an Input Dispatcher of an Linux-based operating system modified to dispatch the given input event to the corresponding application after receiving the indication that the invalidate-based display image based upon the previous input event has been posted to the output interface driver.

15. The one or more non-transitory computing device readable media including one or more sets of computing device executable instructions which when executed by the one or more processing units implement the system according to claim 14, wherein the input dispatcher comprises an Surface Flinger of the Linux-based operating system modified to send the indication that the invalidate-based display image based upon the given input event has been posted to the output interface driver to the Input Dispatcher.

16. The one or more non-transitory computing device readable media including one or more sets of computing device executable instructions which when executed by the one or more processing units implement the system according to claim 14, further comprising a Unix pipe between the Surface Flinger and the Input Dispatcher for sending the indication that the invalidate-based display image based upon the given input event has been posted to the output interface driver from the Surface Flinger to the Input Dispatcher.

17. The one or more non-transitory computing device readable media including one or more sets of computing device executable instructions which when executed by the one or more processing units implement the system according to claim 14, wherein the input events are dispatched on a per application basis.

18. The one or more non-transitory computing device readable media including one or more sets of computing device executable instructions which when executed by the one or more processing units implement the system according to claim 14, wherein input events for each applicable application are queued separately for dispatching by the input dispatcher.

19. The one or more non-transitory computing device readable media including one or more sets of computing device executable instructions which when executed by the one or more processing units implement the system according to claim 14, wherein the input events are dispatched for all applications.

20. The one or more non-transitory computing device readable media including one or more sets of computing device executable instructions which when executed by the one or more processing units implement the system according to claim 14, wherein input events are system-wide queued for dispatching by the input dispatcher.

* * * * *